United States Patent
Biere et al.

(10) Patent No.: US 8,326,673 B1
(45) Date of Patent: Dec. 4, 2012

(54) CARRIER DATA BASED PRODUCT INVENTORY MANAGEMENT AND MARKETING

(75) Inventors: Devon L. Biere, Olathe, KS (US); Wing K. Lee, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1062 days.

(21) Appl. No.: 11/617,703

(22) Filed: Dec. 28, 2006

(51) Int. Cl.
*G06Q 10/00* (2012.01)

(52) U.S. Cl. .................. 705/7.29; 705/7.11; 705/14.69; 705/14.73; 700/97; 235/375; 235/380; 235/385

(58) Field of Classification Search .................. None
See application file for complete search history.

(56) References Cited

U.S. PATENT DOCUMENTS

| | | | |
|---|---|---|---|
| 5,636,346 A | 6/1997 | Saxe | |
| 5,761,648 A | 6/1998 | Golden et al. | |
| 5,848,396 A | 12/1998 | Gerace | |
| 5,848,397 A | 12/1998 | Marsh et al. | |
| 5,918,014 A | 6/1999 | Robinson | |
| 5,918,041 A | 6/1999 | Berstis | |
| 5,933,811 A | 8/1999 | Angles et al. | |
| 5,937,392 A | 8/1999 | Alberts | |
| 5,974,398 A | 10/1999 | Hanson et al. | |
| 6,202,023 B1 | 3/2001 | Hancock et al. | |
| 6,233,566 B1 * | 5/2001 | Levine et al. | 705/36 R |
| 6,266,649 B1 | 7/2001 | Linden et al. | |
| 6,286,005 B1 | 9/2001 | Cannon | |
| 6,317,722 B1 | 11/2001 | Jacobi et al. | |
| 6,321,983 B1 * | 11/2001 | Katayanagi et al. | 235/380 |
| 6,332,127 B1 | 12/2001 | Bandera et al. | |
| 6,826,575 B1 | 11/2004 | Waclawski | |
| 6,834,266 B2 * | 12/2004 | Kumar et al. | 705/7.29 |
| 6,839,680 B1 | 1/2005 | Liu et al. | |
| 6,853,982 B2 | 2/2005 | Smith et al. | |
| 6,910,017 B1 * | 6/2005 | Woo et al. | 705/7.29 |
| 6,963,867 B2 | 11/2005 | Ford et al. | |
| 6,966,536 B2 | 11/2005 | Enomoto et al. | |
| 6,990,462 B1 | 1/2006 | Wilcox et al. | |
| 7,022,905 B1 | 4/2006 | Hinman et al. | |
| 7,065,532 B2 | 6/2006 | Elder et al. | |
| 7,096,194 B2 * | 8/2006 | Johnson | 705/35 |
| 7,127,313 B2 * | 10/2006 | Neri | 700/103 |
| 7,143,143 B1 | 11/2006 | Thompson | |
| 7,251,615 B2 * | 7/2007 | Woo | 705/7.35 |
| 7,284,033 B2 | 10/2007 | Jhanji | |
| 7,353,267 B1 | 4/2008 | Cunningham et al. | |
| 7,406,436 B1 * | 7/2008 | Reisman | 705/7.32 |
| 7,437,308 B2 * | 10/2008 | Kumar et al. | 705/7.33 |
| 7,481,367 B2 * | 1/2009 | Fees et al. | 235/383 |
| 7,647,258 B2 * | 1/2010 | William et al. | 705/31 |
| 7,676,394 B2 | 3/2010 | Ramer et al. | |

(Continued)

OTHER PUBLICATIONS

Jaikumar Vijayan. (Jul. 2001). IBM service follows products after delivery. Computerworld, 35(28), 14.*

(Continued)

*Primary Examiner* — Gurkanwaljit Singh (57) ABSTRACT

A method and system are disclosed for carrier data based product inventory management and marketing. The method includes receiving a product transaction record relating to a product from a carrier data source. The method also includes determining a present phase in a life cycle for the product based on a product history for the product and the product transaction record. The method additionally includes adjusting a product management plan for the product based on the present phase in the life cycle.

22 Claims, 5 Drawing Sheets

U.S. PATENT DOCUMENTS

| | | | |
|---|---|---|---|
| 7,840,498 B2* | 11/2010 | Frank et al. | 705/310 |
| 7,958,005 B2 | 6/2011 | Dangaltchev | |
| 7,974,616 B1 | 7/2011 | Urbanek | |
| 2001/0039500 A1* | 11/2001 | Johnson | 705/1 |
| 2001/0044743 A1 | 11/2001 | McKinley et al. | |
| 2001/0047294 A1 | 11/2001 | Rothschild | |
| 2002/0010627 A1 | 1/2002 | Lerat | |
| 2002/0013727 A1 | 1/2002 | Lee | |
| 2002/0026355 A1 | 2/2002 | Mitsuoka et al. | |
| 2002/0026361 A1 | 2/2002 | Blom | |
| 2002/0030100 A1* | 3/2002 | Katayanagi et al. | 235/380 |
| 2002/0032771 A1 | 3/2002 | Gledje | |
| 2002/0035474 A1 | 3/2002 | Alpdemir | |
| 2002/0059387 A1 | 5/2002 | Wolfe | |
| 2002/0060246 A1 | 5/2002 | Gobburu et al. | |
| 2002/0065713 A1 | 5/2002 | Awada et al. | |
| 2002/0091569 A1 | 7/2002 | Kitaura et al. | |
| 2002/0091571 A1 | 7/2002 | Thomas et al. | |
| 2002/0095333 A1 | 7/2002 | Jokinen et al. | |
| 2002/0107027 A1 | 8/2002 | O'Neil | |
| 2002/0128904 A1 | 9/2002 | Carruthers et al. | |
| 2002/0128908 A1 | 9/2002 | Levin et al. | |
| 2002/0143630 A1 | 10/2002 | Steinman et al. | |
| 2002/0152133 A1* | 10/2002 | King et al. | 705/26 |
| 2002/0184080 A1 | 12/2002 | Murad et al. | |
| 2003/0004802 A1 | 1/2003 | Callegari | |
| 2003/0004808 A1 | 1/2003 | Elhaoussine et al. | |
| 2003/0018516 A1 | 1/2003 | Ayala et al. | |
| 2003/0018558 A1* | 1/2003 | Heffner et al. | 705/37 |
| 2003/0028451 A1* | 2/2003 | Ananian | 705/27 |
| 2003/0050863 A1 | 3/2003 | Radwin | |
| 2003/0074251 A1* | 4/2003 | Kumar et al. | 705/10 |
| 2003/0074259 A1 | 4/2003 | Slyman, Jr. et al. | |
| 2003/0101024 A1 | 5/2003 | Adar et al. | |
| 2003/0101449 A1 | 5/2003 | Bentolila et al. | |
| 2003/0126250 A1 | 7/2003 | Jhanji | |
| 2003/0171962 A1* | 9/2003 | Hirth et al. | 705/7 |
| 2003/0172007 A1* | 9/2003 | Helmolt et al. | 705/28 |
| 2003/0229502 A1* | 12/2003 | Woo | 705/1 |
| 2004/0019540 A1* | 1/2004 | William et al. | 705/31 |
| 2004/0019541 A1* | 1/2004 | William et al. | 705/31 |
| 2004/0111315 A1* | 6/2004 | Sharma et al. | 705/11 |
| 2005/0021403 A1 | 1/2005 | Ozer et al. | |
| 2005/0028188 A1 | 2/2005 | Latona et al. | |
| 2005/0101332 A1 | 5/2005 | Kotzin | |
| 2005/0102272 A1* | 5/2005 | Kumar et al. | 707/2 |
| 2005/0114829 A1* | 5/2005 | Robin et al. | 717/101 |
| 2005/0177419 A1 | 8/2005 | Choi et al. | |
| 2005/0194431 A1* | 9/2005 | Fees et al. | 235/375 |
| 2005/0197887 A1* | 9/2005 | Zuerl et al. | 705/10 |
| 2005/0197918 A1* | 9/2005 | Wittmer et al. | 705/26 |
| 2005/0215238 A1 | 9/2005 | Macaluso | |
| 2005/0228754 A1 | 10/2005 | Pezzaniti et al. | |
| 2005/0246394 A1* | 11/2005 | Neri | 707/201 |
| 2005/0256759 A1* | 11/2005 | Acharya et al. | 705/10 |
| 2005/0278296 A1* | 12/2005 | Bostwick | 707/1 |
| 2006/0080135 A1* | 4/2006 | Frank et al. | 705/1 |
| 2006/0080171 A1 | 4/2006 | Jardins et al. | |
| 2006/0085253 A1 | 4/2006 | Mengerink et al. | |
| 2006/0085517 A1 | 4/2006 | Kaurila | |
| 2006/0224437 A1* | 10/2006 | Gupta et al. | 705/10 |
| 2007/0005647 A1 | 1/2007 | Cugi et al. | |
| 2007/0026871 A1 | 2/2007 | Wager | |
| 2007/0061229 A1 | 3/2007 | Ramer et al. | |
| 2007/0100963 A1 | 5/2007 | Ban et al. | |
| 2007/0106520 A1* | 5/2007 | Akkiraju et al. | 705/1 |
| 2007/0130005 A1 | 6/2007 | Jaschke | |
| 2007/0192715 A1* | 8/2007 | Kataria et al. | 715/764 |
| 2007/0198339 A1 | 8/2007 | Shen et al. | |
| 2007/0208619 A1 | 9/2007 | Branam et al. | |
| 2007/0239518 A1 | 10/2007 | Chung et al. | |
| 2008/0004884 A1 | 1/2008 | Flake et al. | |
| 2008/0082412 A1* | 4/2008 | Tallyn et al. | 705/14 |
| 2008/0126515 A1 | 5/2008 | Chambers et al. | |
| 2008/0147478 A1* | 6/2008 | Mall et al. | 705/10 |
| 2008/0228583 A1 | 9/2008 | MacDonald et al. | |
| 2009/0222329 A1 | 9/2009 | Ramer et al. | |
| 2011/0131109 A1 | 6/2011 | Pappas et al. | |

OTHER PUBLICATIONS

Kurawarwala, A. A., & Matsuo, H. (1996). Forecasting and inventory management of short life-cycle.. Operations Research, 44(1), 131.*

Marshall Fisher, & Kumar Rajaram. (2000). Accurate retail testing of fashion merchandise: Methodology and application. Marketing Science, 19(3), 266-278.*

Scott Stratman. (Nov. 2000). All stocked up. Industrial Distribution, 89(11), 92-96.*

Francis J Connelly, & George Daignault. (1974). The life cycle concept as a long term forecasting model. Academy of Marketing Science. Journal (pre-1986), 2(3), 455.*

Office Action dated Aug. 30, 2010, U.S. Appl. No. 11/557,939, filed Nov. 8, 2006, 52 pages.

Advisory Action dated Sep. 22, 2010, U.S. Appl. No. 11/558,021, filed Nov. 9, 2006, 3 pages.

Lightningcast, Inc., "Lightningcast Mobile Video Advertising Solution," May 2, 2005, 14 pgs.

Patent Application entitled, "Dynamic Advertising Content Distribution and Placement Systems and Methods," by James D. Barnes, et al., filed Apr. 17, 2006 as U.S. Appl. No. 11/405,195.

Patent Application entitled, "Systems and Methods for State-Based Advertisement Messaging Across Media Types," by James D. Barnes, et al., filed May 22, 2006 as U.S. Appl. No. 11/438,540.

Patent Application entitled, "Subscriber Data Insertion Into Advertisements Requests," by James D. Barnes, et al., filed Jul. 21, 2006 as U.S. Appl. No. 11/491,387.

Patent Application entitled, "In-Flight Campaign Optimization," by James D. Barnes, et al., filed Nov. 9, 2006 as U.S. Appl. No. 11/558,021.

Patent Application entitled, "Communication Device Usage Event Profiling," by Robert E. Urbanek, filed Jun. 8, 2006 as U.S. Appl. No. 11/449,078.

Patent application entitled "Seamless Retrieval of Non-Standard Items for a Mobile Device," filed May 12, 2006, as U.S. Appl. No. 11/433,301.

Patent application entitled "Mobile-Device-Based Coupon Management Systems and Methods," filed Apr. 13, 2006, as U.S. Appl. No. 11/403,614.

Patent Application entitled, "Inventory Management Integrating Subscriber and Targeting Data," by James D. Barnes, et al., filed Jun. 26, 2006 as U.S. Appl. No. 11/474,880.

Patent Application entitled, "Behavioral Analysis Engine for Profiling Wireless Subscribers," by James D. Barnes, et al., filed Nov. 8, 2006 as U.S. Appl. No. 11/557,939.

Patent Application entitled, "Advertisement Inventory Management," by James D. Barnes, et al., filed Oct. 27, 2008 as U.S. Appl. No. 12/259,187.

Patent Application entitled, "Method and System for Providing Custom Background-Downloads," by Geoff S. Martin, et al., filed Nov. 16, 2007 as U.S. Appl. No. 11/280,576.

Patent Application entitled, "Method and System Using Location History for Targeted Coupon Distribution," by Von K. McConnell, et al., filed May 17, 2000 as U.S. Appl. No. 09/572,282.

Patent application entitled "Method and System for Facilitating Determination of Call-Drop Locations in a Wireless Network," filed Sep. 9, 2003, as U.S. Appl. No. 10/658,353.

Office Action dated Jun. 17, 2008, U.S. Appl. No. 11/405,195, filed Apr. 17 2006, 7 pages.

Office Action dated Aug. 15, 2008, U.S. Appl. No. 11/405,195, filed Apr. 17, 2006, 12 pages.

Final Office Action dated Feb. 26, 2009, U.S. Appl. No. 11/405,195, 17 pages.

Advisory Action dated May 7, 2009, U.S. Appl. No. 11/405,195, 2 pages.

Office Action dated Aug. 18, 2009, U.S. Appl. No. 11/405,195, 17 pages.

Office Action dated Feb. 27, 2009, U.S. Appl. No. 11/433,301, filed May 12, 2006, 13 pages.

Notice of Allowance dated Oct. 26, 2009, U.S. Appl. No. 11/433,301, filed May 12, 2006, 7 pages.

Office Action dated Jun. 17, 2008, U.S. Appl. No. 11/403,614, filed Apr. 13, 2006, 7 pages.

Office Action dated Aug. 27, 2008, U.S. Appl. No. 11/403,614, filed Apr. 13, 2006, 11 pages.
Final Office Action dated Mar. 4, 2009, U.S. Appl. No. 11/403,614, filed Apr. 13, 2006, 12 pages.
Advisory Action dated May 7, 2009, U.S. Appl. No. 11/403,614, filed Apr. 13, 2006, 3 pages.
Office Action dated Aug. 20, 2009, U.S. Appl. No. 11/403,614, filed Apr. 13, 2006, 11 pages.
Office Action dated Nov. 3, 2008, U.S. Appl. No. 11/438,540, filed May 22, 2006, 14 pages.
Office Action dated Apr. 28, 2009, U.S. Appl. No. 11/438,540, filed May 22, 2006, 16 pages.
Office Action dated Jul. 10, 2009, U.S. Appl. No. 11/438,540, filed May 22, 2006, 3 pages.
Office Action dated Oct. 16, 2009, U.S. Appl. No. 11/438,540, filed May 22, 2006, 12 pages.
Office Action dated Feb. 4, 2009, U.S. Appl. No. 11/491,387, filed Jul. 21, 2006, 9 pages.
Final Office Action dated Aug. 6, 2009, U.S. Appl. No. 11/491,387, filed Jul. 21, 2006, 13 pages.
Advisory Action dated Oct. 19, 2009, U.S. Appl. No. 11/491,387, filed Jul. 21, 2006, 4 pages.
Office Action dated Jan. 6, 2010, U.S. Appl. No. 11/558,021, filed Nov. 9, 2006, 7 pages.
Office Action dated Nov. 14, 2008, U.S. Appl. No. 11/474,880, filed Jun. 26, 2006, 17 pages.
Final Office Action dated May 28, 2009, U.S. Appl. No. 11/474,880, filed Jun. 26, 2006, 23 pages.
Advisory Action dated Oct. 19, 2009, U.S. Appl. No. 11/474,880, filed Jun. 26, 2006, 4 pages.
Advisory Action (corrected) dated Oct. 27, 2009, U.S. Appl. No. 11/474,880, filed Jun. 26, 2006, 4 pages.
Office Action dated Mar. 5, 2010, U.S. Appl. No. 11/474,880, filed Jun. 26, 2006, 24 pages.
Final Office Action dated Apr. 20, 2010, U.S. Appl. No. 11/438,540, filed May 22, 2006, 26 pages.
Final Office Action dated Jun. 29, 2010, U.S. Appl. No. 11/558,021, filed Nov. 9, 2006, 28 pages.
Advisory Action dated Jul. 2, 2010, U.S. Appl. No. 11/438,540, filed May 22, 2006, 4 pages.
Final Office Action dated Aug. 18, 2010, U.S. Appl. No. 11/474,880, filed Jun. 26, 2006, 20 pages.
Final Office Action dated Jan. 13, 2011, U.S. Appl. No. 11/557,939, filed Nov. 8, 2006.
Office Action dated Oct. 14, 2010, U.S. Appl. No. 11/438,540, filed May 22, 2006.
Final Office Action dated Oct. 27, 2010, U.S. Appl. No. 11/405,195, filed Apr. 17, 2006.
Final Office Action dated Nov. 8, 2010, U.S. Appl. No. 11/403,614, filed Apr. 13, 2006.
Examiner's Answer dated Nov. 8, 2010, U.S. Appl. No. 11/491,387, filed Jul. 21, 2006.
Office Action dated Feb. 8, 2011, U.S. Appl. No. 11/405,195, filed Apr. 17, 2006.
Final Office Action dated Jul. 22, 2011, U.S. Appl. No. 11/405,195, filed Apr. 17, 2006.
Final Office Action dated Sep. 7, 2011, U.S. Appl. No. 11/474,880, filed Jun. 26, 2006.
Office Action dated Jul. 21, 2011, U.S. Appl. No. 12/259,187, filed Oct. 27, 2008.
Patent Application entitled "Seamless Retrieval of Non-Standard Items for a Mobile Device," by James D. Barnes, et al., filed Jan. 12, 2010, as U.S. Appl. No. 12/686,188.
Examiner's Answer dated Oct. 27, 2011, U.S. Appl. No. 11/438,540, filed May 22, 2006.
Advisory Action dated Nov. 15, 2011, U.S. Appl. No. 11/474,880, filed Jun. 26, 2006.
Final Office Action dated Dec. 12, 2011, U.S. Appl. No. 12/259,187, filed Oct. 27, 2008.
Office Action dated Apr. 6, 2012, U.S. Appl. No. 11/405,195, filed Apr. 17, 2006.
Examiner's Answer dated May 1, 2012, U.S. Appl. No. 11/474,880, filed Jun. 26, 2006.
Advisory Action dated Feb. 29, 2012, U.S. Appl. No. 12/259,187, filed Oct. 27, 2008.
Final Office Action dated Mar. 30, 2011, U.S. Appl. No. 11/438,540, filed May 22, 2006.
Office Action dated Mar. 30, 2011, U.S. Appl. No. 11/474,880, filed Jun. 26, 2006.
Advisory Action dated Mar. 22, 2011, U.S. Appl. No. 11/557,939, filed Nov. 8, 2006.

\* cited by examiner

CARRIER DATA BASED PRODUCT INVENTORY MANAGEMENT AND MARKETING

PRIORITY

This application claims priority to U.S. patent application Ser. No. 11/557,939, filed Nov. 8, 2006, entitled "Behavioral Analysis Engine for Profiling Wireless Subscribers," by James Barnes, et al., which is incorporated by reference in its entirety.

BACKGROUND

Mobile communication devices, such as cellular telephones, communicate through networks provided by a carrier. Through carrier networks, the mobile communications devices are able to obtain products in the form of content from various content providers. For example, users of cellular telephones can download audio clips (e.g., songs) to be played through the phone as a ringer. Other content can be similarly obtained, including games, software utilities, and images that serve as a background on the telephone's display. Various services can also be accessed, including text messaging, email services, news alerts, etc., and such services may also be viewed as products of the carrier.

Products, such as content or services described above, may be managed and marketed much like products traditionally marketed and sold in stores or on the internet. Maintaining an inventory of such products creates numerous issues including a need for efficient management of resources and marketing efforts to maximize the value.

SUMMARY

Methods and systems are disclosed for carrier data based inventory management and marketing. An illustrative method is provided that includes receiving a product transaction record relating to a product from a carrier data source. The method also includes determining a present phase in a life cycle for the product based on a product history for the product and the product transaction record. The method further includes adjusting a product management plan for the product based on the present phase in the life cycle.

The present disclosure also describes a carrier system for carrier data based inventory management and marketing. The carrier system includes a plurality of data sources that provide product transaction records relating to a plurality of products, wherein each product data record is generated by a mobile device activity of a subscriber. The carrier system also includes a data store that stores a product history for each product of the plurality of products. The carrier system further includes a product life cycle management engine and a marketing engine. The product life cycle management engine determines a present phase in a life cycle for each product of the plurality of products based on the product history for each product and the product transaction record for each product. The marketing engine adjusts a product management plan for each product based on the present phase in the life cycle determined by the product life cycle management engine.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

It should be understood at the outset that although an illustrative implementation of one embodiment of the present invention is illustrated below, the present system may be implemented using any number of techniques, whether currently known or in existence. The present disclosure should in no way be limited to the implementations, drawings, and techniques illustrated below, but may be modified as desired and as would be understood by one of ordinary skill in the art.

A carrier that provides network services to mobile communication devices is in a unique position to gather vast quantities of information pertaining to its subscribers, the devices used by the subscribers, and any products purchased with and used by such devices. Specifically, carriers have unique access to demographic and behavioral information pertaining to subscribers at a detailed level, providing insight into, for example, which products a subscriber purchases using her mobile communication device, how she uses the products, and even how often she uses the products.

The carrier based data product inventory management engine and marketing engine of the present disclosure focus on making use of vast amounts of information available about which products are purchased by whom and how they are used in order to improve inventory management and marketing for such products. By determining where a product is in its life cycle and by determining a category and segments in which a product is successfully being marketed, a product's management and marketing may be adjusted in order to extend and prolong the profitable phases in its life cycle, thereby maximizing return on investment. Adjustments may be made in the management and marketing of specific products successful with a particular demographic or segment, or may also be made with respect to the management and marketing of specific categories of products. Furthermore, with the vast quantity of information available to a carrier, a product's life cycle phase (and success) may be linked with particular segments, and prioritized or deprioritized over its life cycle marketing to such segments in customized presentations (i.e. online stores, etc.) For example, marketing of a product to a subscriber segment with whom the product has been historically successful could include reducing the marketing during a decline phase, or changing priority of marketing for the product earlier on in order to put off the decline phase.

Figure 1:
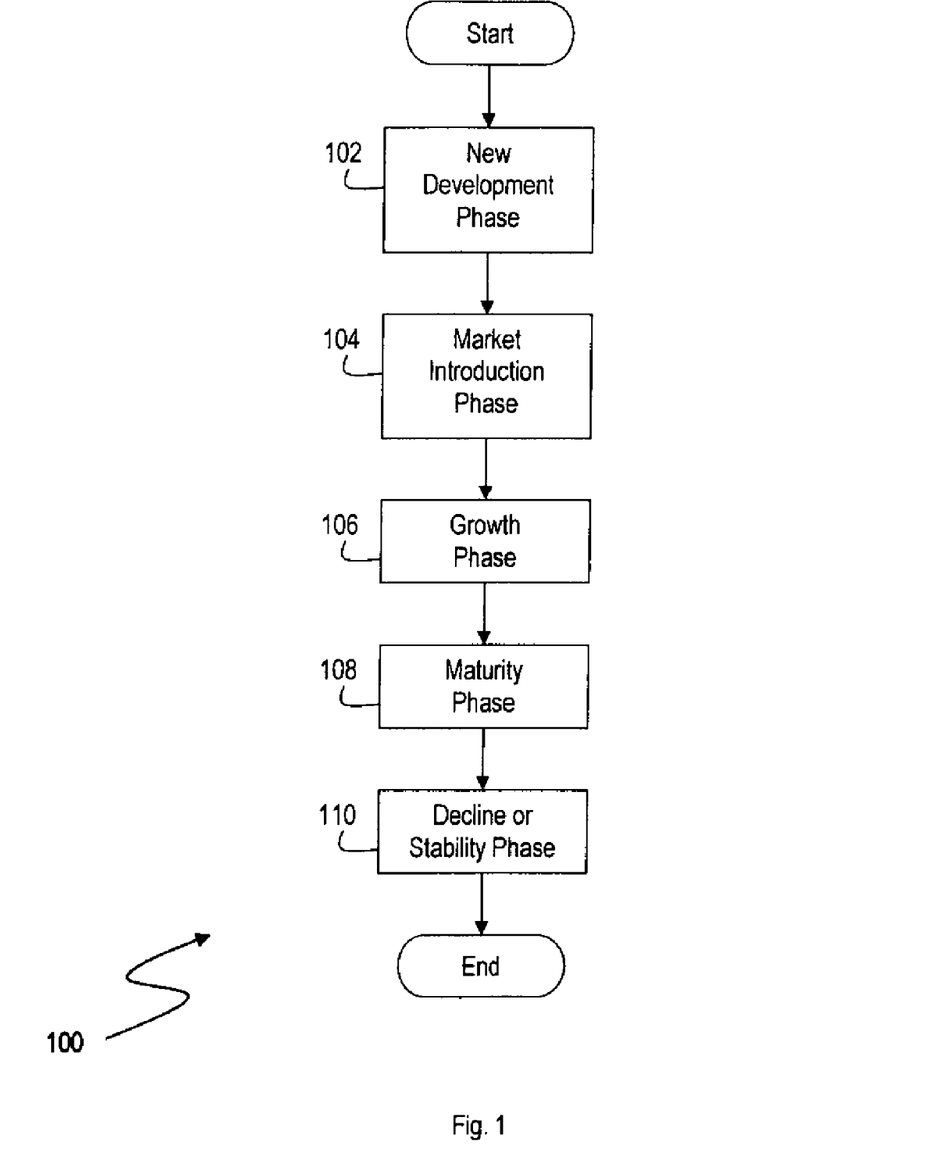
FIG. 1 is a flowchart of a lifecycle through which a product goes over the period of its life in accordance with embodiments of the present disclosure.

Referring to FIG. 1, a block diagram is shown of an illustrative life cycle 100 through which a product goes over the course of its life in accordance with embodiments of the present disclosure. The general concept of product life cycle phases is known in the field of marketing. The illustrative life cycle 100 of a product, such as content for purchase by a mobile communications device or a service for use on a mobile communications device, begins with the new development stage (block 102). During the new development phase (block 102), the enterprise developing the product may work on the research and development that are involved in making a new product available. Thus, in this phase, expenses may be very high, while there is little to no sales revenue, and losses may be evident as the enterprise invests in the new product.

The life cycle 100 continues with the market introduction phase (block 104). During the market introduction phase (block 104), costs may be high with initial marketing strategies, and sales volume starts low. In the market introduction phase (block 104), there may be little to no competition, as competing enterprises watch for acceptance of the product and segment growth. Losses may be evident as the enterprise launches the new product in the market introduction phase (block 104).

The life cycle 100 continues with the growth phase (block 106). During the growth phase (block 106), the costs of producing and selling the product decrease due to economies of scale, and sales volume increases. The enterprise may begin to make profits. As the product grows in the market, public awareness of the product may increase due to marketing efforts, and competitors may begin to join the enterprise in the field of the product with competing products.

The life cycle 100 continues with the maturity phase (block 108). During the maturity phase (block 108), costs for marketing decrease as the product becomes well established in the market and the need for publicity is less. The sales volume for the product peaks. Offerings of competitive products increase, and therefore prices begin to drop. The maturity phase (block 108) is the most profitable phase of the life cycle 100.

The life cycle 100 concludes with the decline or stability phase (block 110) in which the product either stabilizes for the long term, or declines to the completion of its life. In the decline or stability phase (block 110), costs may become counter-optimal, and prices, and therefore profit, may drop off.

In each phase of the life cycle 100, marketing and management for a product may be optimized so as to minimize time spent with a product in the costly or low profit phases, and maximize and prolong the profitable phases. Different product types may have different typical lengths in, or aftermarket patterns of, such phases.

Figure 2:
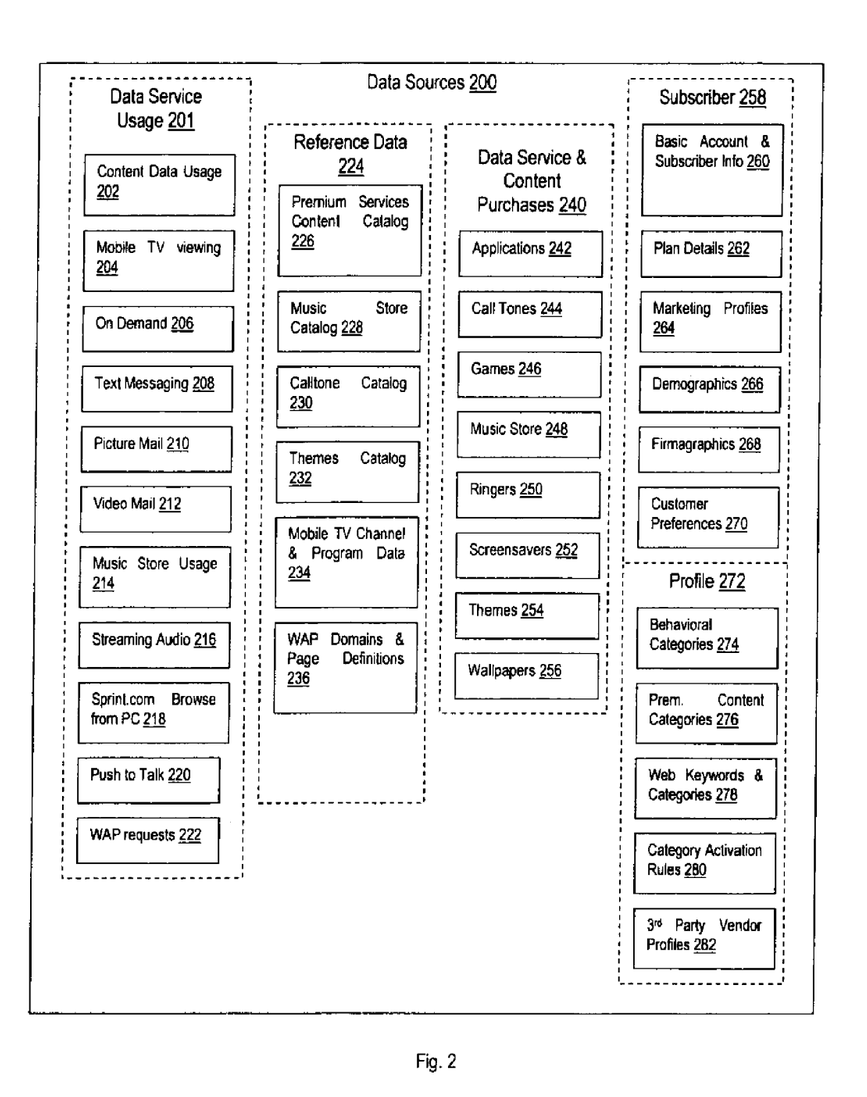
FIG. 2 is a block diagram of illustrative data sources used in conjunction with a product life cycle management engine in accordance with embodiments of the present disclosure.

Referring to FIG. 2, a block diagram is provide to illustrate various raw data sources 200 in a carrier system (which will be described in FIG. 3) that provide detailed product transaction records for carrier data based inventory management and marketing. The data sources 200 provide raw data, in the sense that the data includes great detail, unfiltered and unsummarized, uniquely available to the carrier by nature of the carrier's control over all information traveling to and from mobile devices operating on its network. The data sources 200 may include data service usage data source 201, reference data source 224, data service & content purchases data source 240, subscriber reference data source 258, and subscriber profile data source 272. The various data sources 200 may reside in a single electronic repository or any combination of multiple repositories. The data sources 200 may include data sources for the carrier enterprise as well as any subsidiary company data sources and legacy sources of data that remain after business changes such as mergers.

The data sources 200 include data about how subscribers use their mobile devices, specifics about individual subscribers, and reference data. Specifically, the data service usage data source 201 includes data records pertaining to how subscribers use their mobile devices. The data service usage data source 201 may include records generated by activities undertaken by the subscriber either on the mobile device or in some cases the Internet. The activities may be, for example, content data usage 202 (e.g., the amount of network resources consumed in delivering content to a customer including time elapsed, KB of bandwidth used, etc.), mobile TV viewing 204 done on the mobile device, on demand 206 (e.g., a customized "newsreader" application with user-selected types and/or sources of news), text messaging 208, picture mail 210, video mail 212, music store usage 214 where electronic versions of music may be purchased, streaming audio 216 of music or talk shows, browsing the carrier's web page from a personal computer by logging in, push to talk 220, and/or WAP requests 222 from the mobile device.

Specifically, the data service and content purchases data source 240 includes data records pertaining to purchases made by subscribers from their mobile device. The data service and content purchases data source 240 may include records generated by purchases made by the subscriber either on the mobile device, or in some cases the Internet. The activities may be, for example, the purchase of applications 242, call tones 244, games 246, music files from a music store 248, ringers 250, screen savers 252, themes 254, and/or wallpapers 256, any of which may be used by the subscriber's mobile device.

Specifically, the reference data source 224 includes data records that are used to define associations and categories used in categorization by the behavioral engine as disclosed herein. For example, for the various types of premium content purchases, a catalog may list the items that may be purchased, an item identifier for each item, and the categories associated for each item. The reference data sources 224 may additionally define a hierarchy within the catalogs. For example, a ringer may be comprised of a song that is a fight song for a university team. In the catalog of ringers, that particular ringer may fall into a hierarchy where Music is the highest level, the next level is Theme Songs, and the next level is Sports Teams, and the lowest level is University Sports. At each level, a category may be associated with the ringer, such that when a subscriber purchases the ringer, the category for all of the levels, some of the levels, or just the lowest level may be associated with the subscriber's profile.

The reference data source 224 may include, for example, a premium services content catalog 226, a music store catalog 228, a call tone catalog 230, a themes catalog 232, a mobile TV channel and program data catalog 234, and a WAP domains & page definitions catalog 236. Each of the catalogs maps the items in the catalog to the same categories used when categorizing other types of behaviors, such as mobile web requests.

Specifically, the subscriber reference data source 258 includes data records that maintain carrier data pertaining to subscribers other than the behavioral data processed by the behavioral engine. The subscriber reference data source 258 includes data records such as basic account and subscriber information 260, subscriber plan details 262 (e.g. number of minutes per month, etc.), marketing profile 264 (e.g. subscriber provided demographics used for marketing), demographics 266 (i.e., an individual's traits), firmographics 268 (i.e., a company's traits such as size, industry focus, # of employees, location, etc.), and subscriber preferences 270.

Specifically, the subscriber profile data source 272 includes data records that define categories and rules for use by the behavioral engine as disclosed herein. The subscriber profile data source 272 may include behavioral categories 274 based on usage records, premium content categories 276, web keywords and categories 278 used for mobile web requests, category activation rules 280, and third party vendor profiles 282. Third party vendor profiles may consist of pre-mapped categories associated with premium content that is available from the third party vendor; such third party vendor profiles enable the categories of the present disclosure to be aligned with the categorization of items that has already been done by the third party vendors.

Figure 3:
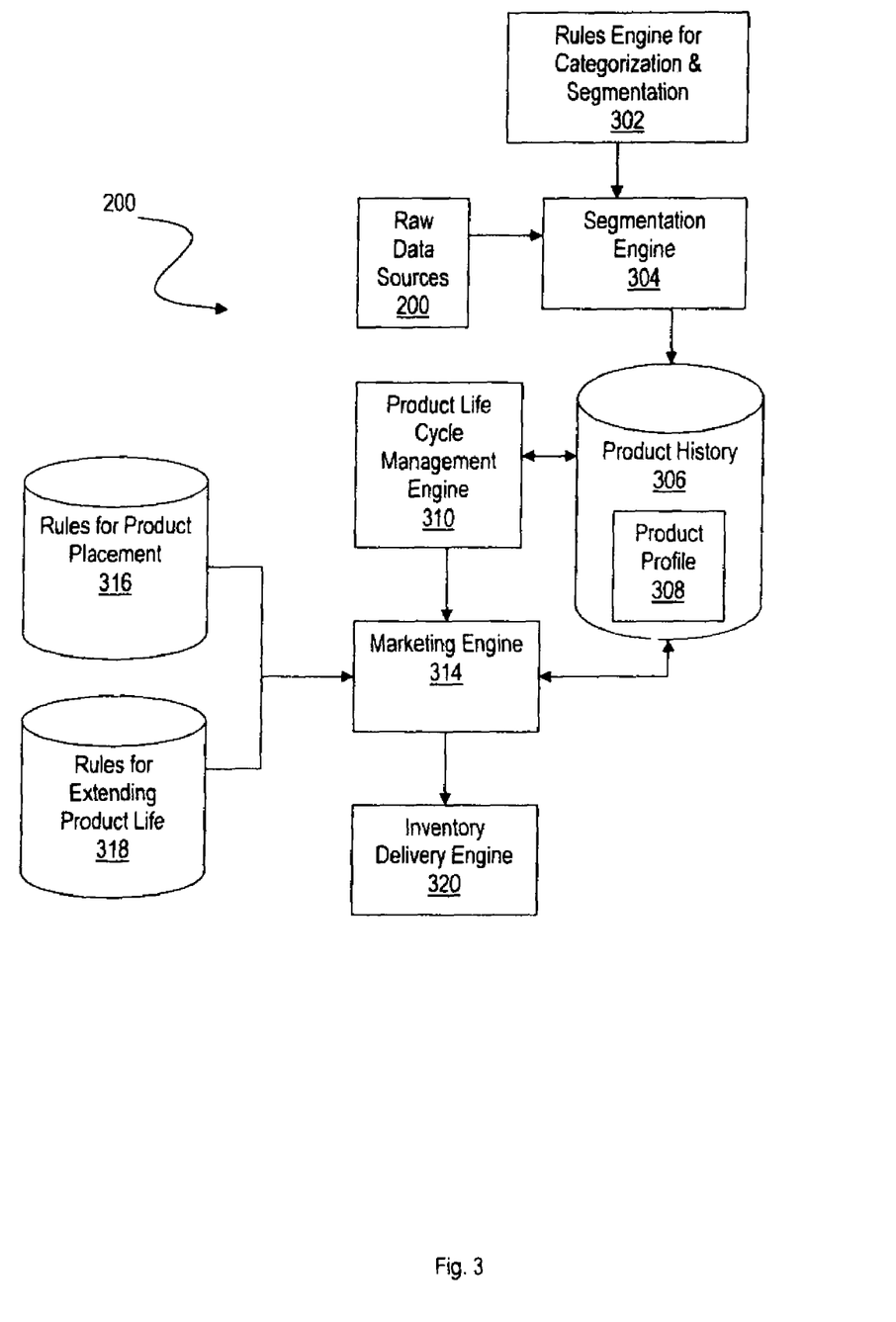
FIG. 3 is a block diagram of a system for carrier data based inventory management and marketing in accordance with embodiments of the present disclosure.

Referring to FIG. 3, a system 300 for carrier data based product inventory management and marketing is shown. The system 300 includes the raw data sources 200, as described with respect to FIG. 2 (i.e. carrier network data sources) accessible to a segmentation engine 304, a data store of rules for categorization and segmentation 302 accessible to the segmentation engine 304. A data store of product history 306 accepts and stores data from the segmentation engine 304. A product life cycle management engine 310 is coupled operatively to the segmentation engine 304 and a marketing engine 314. The marketing engine 314 operably couples to a data store of rules for product placement 316 and a data store of rules for extending product life 318, and provides the results of applying various rules to an inventory delivery engine 320. The various data stores 302, 306, 316, and 318 may each be implemented in a database stored in memory, for example. The various engines 304, 314, and 320 may each be implemented in software executed by a processor, as discussed below with respect FIG. 5. Each of these system components will be described further here.

The data store of rules for categorization and segmentation 302 is a repository that stores various categories into which specific products (services or content purchases) may be categorized. The data store of rules for categorization and segmentation 302 is also a repository that stores various segments to which products may be associated according to demographic or behavioral traits exhibited by users that purchase such products (i.e., by subscribing to a service or by purchasing premium content). For example, according to the rules a premium content ringtone that sounds a university fight song may be categorized as "sports" and a category for the particular university, and may be linked with the segment (demographically speaking) for college aged men that live near the university.

The segmentation engine 304 applies the rules from the data store of rules for categorization and segmentation 302 in order to process the vast amount of incoming raw data from the raw data sources 200, such that products are categorized according to the categories, and analyzed for whether to associate a given product with a segment of subscribers. By segmenting products according to the rules, the segments may, for example, be utilized for adjusting marketing of the products to successfully place the products to reach the subscribers in each segment. By categorizing products according to the same rules, marketing of similar products may, for example, be accomplished.

The data store of product history 306 is a repository that maintains a product history for each product in a product profile 308, including, for example, when the product was introduced, sales since introduction, and segments of subscribers in which sales have been made. The product history provides the information about the product since its launch from the carrier's information, and the product profile 308 includes the information about a product since it's launch based on the various data sources once segmented and categorized by the segmentation engine 304. From the product profile 308, including the latest segmented and categorized data from the segmentation engine 304, it is possible to determine the present phase of the life cycle for a particular product. The product life cycle management engine 310 accesses the data store of product history 306 and determines, based on the most up-to-date categorized, segmented data along with the product's historical data, the present phase of the life cycle for a particular product. The present phase of the life cycle is added to the product profile 308, and may be updated as additional data for the product is delivered from the data sources 200. Additionally, the product life cycle management engine 310 may associate the present phase of the life cycle for a particular product with a particular market segment, as products may be in different phases for different market segments.

For example, the product life cycle management engine 310 may access the data store of product history 306 for Product A (ex. a downloadable song), and find that Product A was introduced 6 weeks ago, and has been selling wildly to the market of teenaged girls, which may be used to determine that Product A is in the Growth phase 106 of its life cycle. After six months, when Product A is featured in a blockbuster movie and sales increase dramatically across the market segments, the product life cycle management engine 310 may determine that Product A is in the Maturity phase 108 of its life cycle. After two years, when sales have dropped below a threshold of the peak in sales, the product life cycle management engine 310 may determine that Product A is in the decline phase 110 of its life cycle.

The marketing engine 314 uses the product profile 308, including the present phase of the life cycle, in order to adjust the management of inventory for the product and/or marketing of the product. Specifically, a product may be placed in a customized presentation (i.e., in a customized online store, or the like) based on a subscriber's identity, if the product is associated with one or more segments into which the subscriber falls, thereby targeting the product to subscribers that are more likely to purchase the product. Additionally, known marketing approaches may be taken to prolong certain phases of the life cycle, such as the growth, maturity, and stability phases, based on the known present phase for a product. Likewise, the inventory of a product may be decreased (such as no longer offering unpopular services, or archiving downloadable products that are seasonal or losing popularity), once the decline phase is indicated for the product. The marketing engine 314 makes such adjustments to inventory management and marketing based on various rules stored in data stores in the system. For example, the data store of rules for product placement 316 includes various business rules for product placement and managing levels of inventory based on the present phase of the life cycle for a given product. One example of a rule for product placement is that a product that is seasonal is advertised prominently and prominently placed in an online store or downloads page for a predetermined period of time before the appropriate holiday begins. Another rule for product placement is that levels of inventory may be automatically reduced when the product life cycle management engine 310 determines that a product is in the decline phase 110, or that the product is moved to archives instead of being advertised or placed prominently in a store or download area.

Another data store is the data store of rules for extending product life 318 that includes various business rules, based on traditional or newly conceived marketing techniques, to extend the profitable phases of a product's life cycle by effectively targeting subscribers based on interest in like products, or strategic placement of the product such that subscribers most likely to purchase the product will be exposed to the product. One example of a rule for extending product life is re-releasing the product as a special edition or otherwise changing the product's presentation (i.e., image, marketing, promotional materials, actual appearance), thereby renewing interest among subscribers. Another rule for extending product life is targeting the same product to a different segment, such as targeting a product previously popular among a certain age group in one region of the country to target a similar age group in another region of the country, based on similar other interests. The present disclosure may be applied as a test of inferred similarities in interests between market segments, such that a product expected to be successful in one segment expected to have similarities with another may be shifted in priority for the new segment, and if the shift is successful, further effort (i.e. prioritization) may be devoted to marketing the product in the new segment based on success in that segment as well as in the similar other segment. Yet another rule for extending product life is improving or modifying the product interface in such a way as to render the product more attractive to the current market segment or a new market segment.

The inventory delivery engine 320 is the feature of the system 300 whereby subscribers purchase the products. For example, the inventory delivery engine 320 may include a web site for downloading premium content such as applications, games, screen savers, ring tones, music, and more. The inventory delivery engine 320 may also include a web site for registering for premium services. Alternatively, the inventory delivery engine 320 may include a traditional store that sells the mobile communications devices for the carriers network, where a subscriber may purchase certain content or services along with the purchase of a mobile communications device. Alternatively, the inventory delivery engine 320 may include the mechanism to "push" product to the mobile communications device based on preferences of the subscriber or as part of a sales and advertising campaign. In such an embodiment, the subscriber is enabled to purchase the product pushed to his device by responding to the pushed communication.

Figure 4:
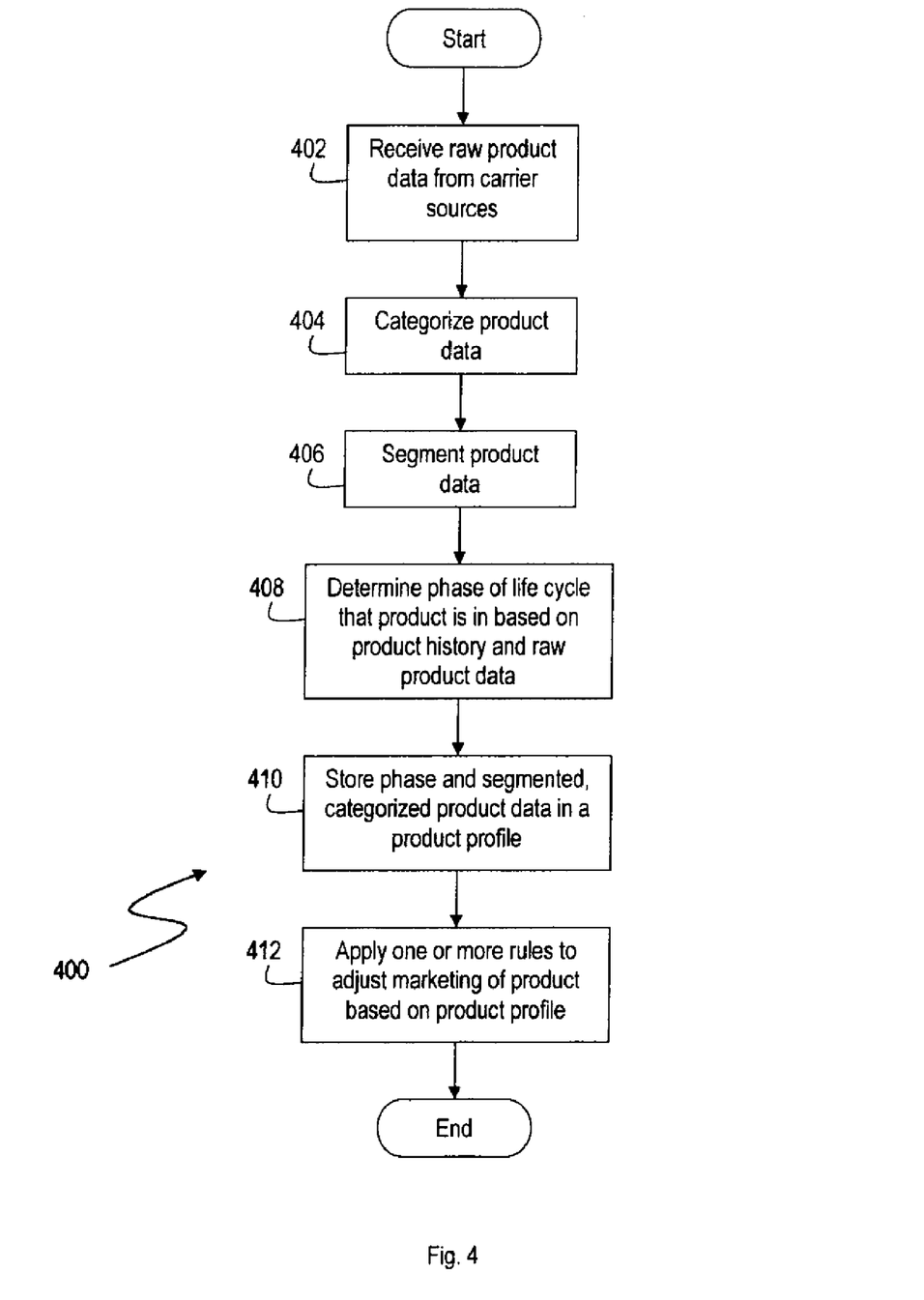
FIG. 4 is a flowchart of an illustrative method for carrier data based inventory management and marketing in accordance with embodiments of the present disclosure.

Referring to FIG. 4, a flowchart is shown for a method 400 for carrier data based product inventory management and marketing. The method 400 begins with the system 300 receiving product transaction records from the carrier raw data sources 200 (block 402). The product transaction records are categorized according to categories from the data store of rules for categorization and segmentation 302 (block 404) and segmented according to subscriber segments from the data store of rules for categorization and segmentation 302 (block 406).

The data processed in blocks 404 and 406 as well as product history is used by the product life cycle management engine 310 to determine the present phase of the life cycle for each product (block 408). The present phase of the life cycle and the segmented, categorized data are added to a product profile 308 and stored (block 410). The marketing engine 314 applies rules for product placement and rules for extending product life to adjust marketing of each product based on the product's product profile (block 412). The method iterates to block 402 to readily improve the inventory management and marketing for products purchased through, used by, or used in conjunction with mobile communication devices.

Illustrative use cases further exhibit the practical advantages of the present disclosure. In one example, the product transaction records may be used in life cycle management of cross-linked products. Cross-linked products may refer to products that are related to one another by topic (e.g., mobile TV showing of a Saturday Night Live episode and a screen saver of the cast of Saturday Night Live), or related to each other by success within various market segments. The related products may be an explicit link or may be a mere inference of relation. By implementing the present disclosure, knowing the history and present life cycle phase of a first product may result in altering the marketing of a cross-linked product to test for whether a similar trend in life cycle applies, and to test of any inferred relationship between the products. If the trend for the life cycle of the first product does not prove to be true for the cross-linked product, based on feedback, the marketing may be dropped off, while if the trend for the life cycle of the first product is also true for the cross-linked product, the marketing efforts may be duplicated or increased for the cross-linked product. In various embodiments, such a test of the relationship and life cycles may be performed within a single market segment, for example.

In another example, knowledge of the life cycles of products, even as the life cycles vary from one segment to another (i.e. one product may be holding steady for a first segment while declining for a second segment), may be used to personalize the market place in which the products are sold. For example, various products may be purchased through a download site, and thus the appearance and marketing of the site may be tailored, either to the specific user or to specific market segments, based on the knowledge of the product life cycles.

Figure 5:
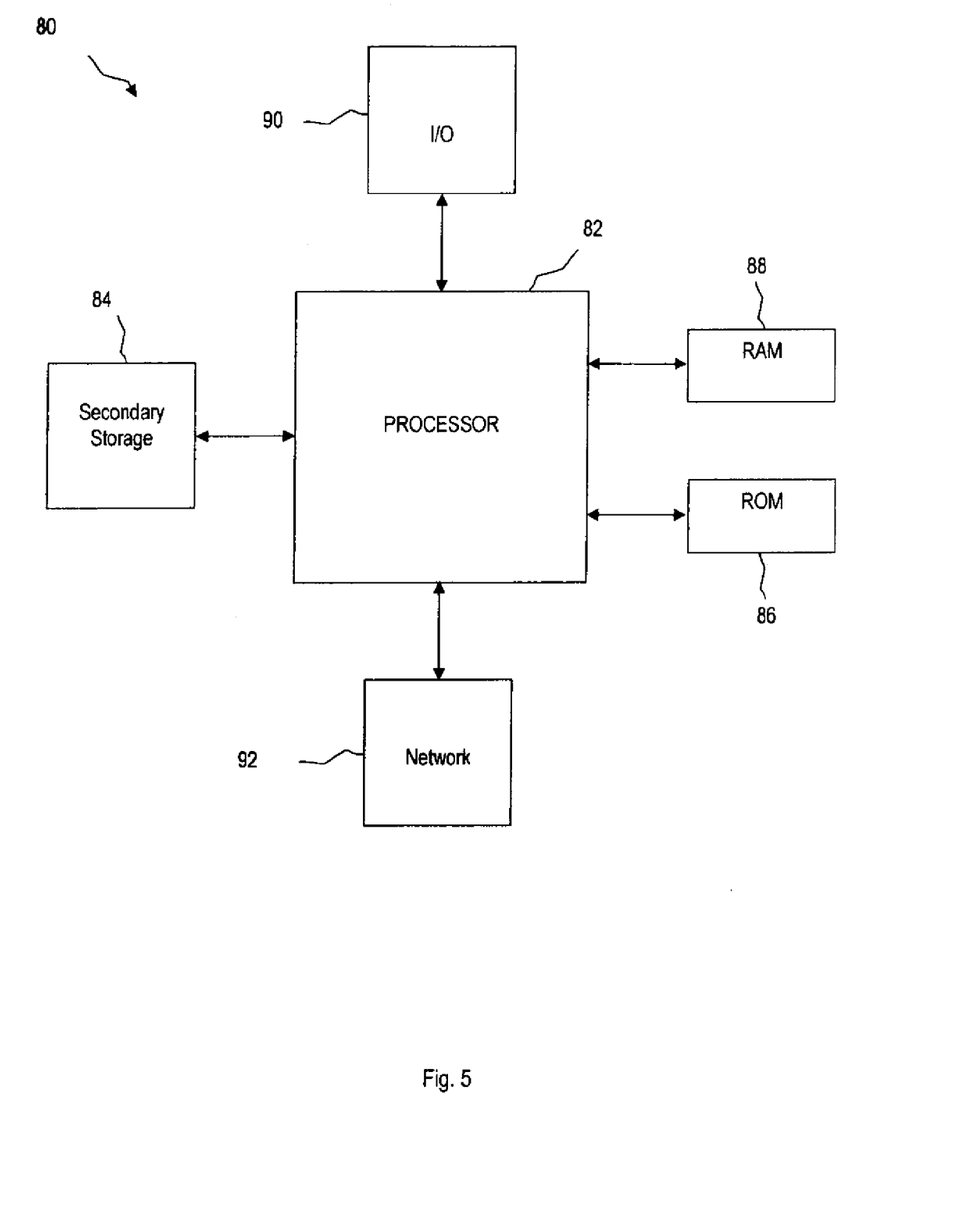
FIG. 5 is a general purpose computer that, according to various embodiments, may be used to implement the present disclosure.

The present disclosure may be implemented, at least partially, on a server or on any general-purpose computer(s) with sufficient processing power, memory resources, and network throughput capability to handle the necessary workload placed upon it. FIG. 5 illustrates a typical, general-purpose computer system suitable for implementing one or more embodiments disclosed herein. The computer system 80 includes a processor 82 (which may be referred to as a central processor unit or CPU) that is in communication with memory devices including secondary storage 84, reads only memory (ROM) 86, random access memory (RAM) 88, input/output (I/O) 90 devices, and network connectivity devices 92. The processor may be implemented as one or more CPU chips.

The secondary storage 84 is typically comprised of one or more disk drives or tape drives and is used for non-volatile storage of data and as an over-flow data storage device if RAM 88 is not large enough to hold all working data. Secondary storage 84 may be used to store programs which are loaded into RAM 88 when such programs are selected for execution. The ROM 86 is used to store instructions and perhaps data which are reads during program execution. ROM 86 is a non-volatile memory device which typically has a small memory capacity relative to the larger memory capacity of secondary storage. The RAM 88 is used to store volatile data and perhaps to store instructions. Access to both ROM 86 and RAM 88 is typically faster than to secondary storage 84.

I/O 90 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 92 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 92 devices may enable the processor 82 to communicate with an Internet or one or more intranets. With such a network connection, it is contemplated that the processor 82 might receive information from the network, or might output information to the network in the course of performing the above-described method steps. Such information, which is often represented as a sequence of instructions to be executed using processor 82, may be received from and outputted to the network, for example, in the form of a computer data signal embodied in a carrier wave.

Such information, which may include data or instructions to be executed using processor 82 for example, may be received from and outputted to the network, for example, in the form of a computer data baseband signal or signal embodied in a carrier wave. The baseband signal or signal embodied in the carrier wave generated by the network connectivity 92 devices may propagate in or on the surface of electrical conductors, in coaxial cables, in waveguides, in optical media, for example optical fiber, or in the air or free space. The information contained in the baseband signal or signal embodied in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 82 executes instructions, codes, computer programs, scripts which it accesses from hard disk, floppy disk, optical disk (these various disk based systems may all be considered secondary storage 84), ROM 86, RAM 88, or the network connectivity devices 92.

While several embodiments have been provided in the present disclosure, the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

Although the present invention and its advantages have been described in detail, various changes, substitutions and alterations may be made herein without departing from the spirit and scope of the invention as defined by the appended claims.

What is claimed is:

1. A method, comprising:
   receiving a product transaction record relating to a product from a carrier data source, wherein the carrier associated with the carrier data source provides network services to a mobile communication device, and wherein the product comprises at least one of a content or a service for use on the mobile communication device;
   determining, by a product life cycle management engine stored on a non-transitory computer readable medium and executable by a processor, a present phase in a marketing life cycle for the product based on a product history for the product and the product transaction record;
   adjusting, by a marketing engine stored on a non-transitory computer readable medium and executable by a processor, a product management plan for the product based on the present phase in the marketing life cycle;
   wherein adjusting the product management plan for the product comprises applying a business rule for extending the marketing life cycle of the product;
   wherein applying the business rule for extending the marketing life cycle of the product comprises targeting the same product to a different segment with at least one interest in common with a segment that previously purchased the product; and
   wherein targeting the same product to the different segment comprises pushing the product to a second mobile communication device of at least one user in the different segment to enable the at least one user to purchase the product by responding to the push communication.

2. The method according to claim 1, further comprising:
   categorizing the product transaction record;
   segmenting the categorized product data record; and
   storing the categorized, segmented product data record in a product profile for the product.

3. The method according to claim 2, further comprising adding the present phase of the marketing life cycle for the product to the product profile.

4. The method according to claim 1, further comprising returning feedback on results of adjusting the product management plan, and further adjusting the product management plan based on the feedback.

5. The method according to claim 1, wherein adjusting the product management plan for the product further comprises applying a business rule for product placement.

6. The method according to claim 5, wherein applying the business rule for product placement comprises prominently placing a product whose present phase indicates seasonal popularity in an inventory delivery engine for a predetermined period of time before the appropriate season begins.

7. The method according to claim 5, wherein applying the business rule for product placement comprises automatically reducing levels of inventory for, reducing promotion of, or reducing priority of a product whose present phase is a decline phase.

8. The method according to claim 1, wherein applying the business rule for extending the marketing life cycle of the product further comprises re-releasing the product with a new product presentation, thereby renewing interest among subscribers.

9. The method according to claim 1, wherein the product transaction record is generated by a mobile communication device activity of a subscriber.

10. A computer-readable medium storing a software program that, when executed by a processor, causes the processor to:
   receive a product transaction record relating to a product from a carrier data source, wherein the carrier associated with the carrier data source provides network services to a mobile communication device, and wherein the product comprises at least one of a content or a service for use on the mobile communication device;

determine a present phase in a marketing life cycle for the product based on a product history for the product and the product transaction record; and adjust a product management plan for the product based on the present phase in the marketing life cycle by applying a business rule for product placement, wherein applying the business rule for product placement comprises prominently placing a product whose present phase indicates seasonal popularity in an inventory delivery engine for a predetermined period of time before the appropriate season begins, and wherein the inventory delivery engine comprises an online store or a downloads page;

wherein adjusting the product management plan for the product further comprises applying a business rule for extending the marketing life cycle of the product;

wherein applying the business rule for extending the marketing life cycle of the product comprises targeting the same product to a different segment with at least one interest in common with a segment that previously purchased the product; and wherein targeting the same product to the different segment comprises pushing the product to a second mobile communication device of at least one user in the different segment to enable the at least one user to purchase the product by responding to the push communication.

11. The computer-readable medium storing a software program according to claim 10, wherein the software, when executed by a processor, causes the processor to:

categorize the product transaction record;

segment the categorized product data record; and store the categorized, segmented product data record in a product profile for the product.

12. The computer-readable medium storing a software program according to claim 10, wherein the software, when executed by a processor, further causes the processor to return feedback on results of adjusting the product management plan, and further adjust the product management plan based on the feedback.

13. The computer-readable medium storing a software program according to claim 11, wherein the software, when executed by a processor, further causes the processor to add the present phase of the marketing life cycle for the product to the product profile.

14. The computer-readable medium storing a software program according to claim 10, wherein the software, when executed by a processor, causes the processor to apply the business rule for product placement comprises automatically reducing promotion of, or reducing priority of a product whose present phase is a decline phase.

15. The computer-readable medium storing a software program according to claim 10, wherein applying the business rule for extending the marketing life cycle of the product further comprises re-releasing the product with a new product presentation, thereby renewing interest among subscribers.

16. A carrier system, comprising:

a plurality of data sources that provide product transaction records relating to a plurality of products, wherein each product data record is generated by a mobile device activity of a subscriber of a carrier, wherein the carrier provides network services to a mobile device, and wherein each product of the plurality of products comprises at least one of a content or a service for use on a mobile device;

a non-transitory computer readable medium comprising a data store that stores a product history for each product of the plurality of products;

a non-transitory computer readable medium storing a product life cycle management engine and a processor that executes the product life cycle management engine to determine a present phase in a marketing life cycle for each product of the plurality of products based on the product history for each product and the product transaction record for each product; and a non-transitory computer readable medium storing a marketing engine and a processor that executes the marketing engine to adjust a product management plan for each product based on the present phase in the marketing life cycle determined by the product life cycle management engine, to access a data store for storing business rules for extending product life, and to apply the business rules from the data stores to adjust a product management plan for each product based on the present phase in the marketing life cycle, wherein the business rules for extending product life comprise modifying a product interface of at least one product of the plurality of products on the mobile device.

17. The carrier system according to claim 16, further comprising:

a non-transitory computer readable medium comprising a data store for storing rules for categorization and segmentation of product transaction records; and a non-transitory computer readable medium storing a segmentation engine and a processor that executes the segmentation engine to categorize the product transaction records according to rules for categorization, segment the categorized product data records according to rules for segmentation, and store the categorized, segmented product data records in product profiles for the products.

18. The carrier system according to claim 17, wherein the product life cycle management engine adds the present phase of the marketing life cycle for each product to the product profile.

19. The carrier system according to claim 17, wherein the data store further stores business rules for product placement.

20. The carrier system according to claim 16, wherein the business rules for extending product life comprise targeting at least one product of the plurality of products to a different segment with at least one interest in common with a segment that previously purchased the at least one product; and wherein targeting the same product to the different segment comprises pushing the at least one product to a second mobile device of at least one user in the different segment to enable the at least one user to purchase the at least one product by responding to the push communication.

21. The carrier system of claim 19, wherein the business rules for product placement comprise prominently placing at least one product of the plurality of products whose present phase indicates seasonal popularity in an inventory delivery engine, stored in a non-transitory computer-readable medium and executed by a processor, for a predetermined period of time before the appropriate season begins, and wherein the inventory delivery engine comprises an online store or a downloads page.

22. The method of claim 1, wherein applying the business rule for extending the marketing life cycle of the product comprises modifying a product interface of the product on the mobile communication device.

* * * * *